June 1, 1926.

S. STEVENS 1,586,856

FASTENER

Filed July 24, 1924    2 Sheets-Sheet 1

Ruey Bartlett Stevens Executrix
Estate-Seriah Stevens,
Deceased Inventor.
by Emery Booth Janney & Varney
Attys.

June 1, 1926.  1,586,856
S. STEVENS
FASTENER
Filed July 24, 1924   2 Sheets-Sheet 2
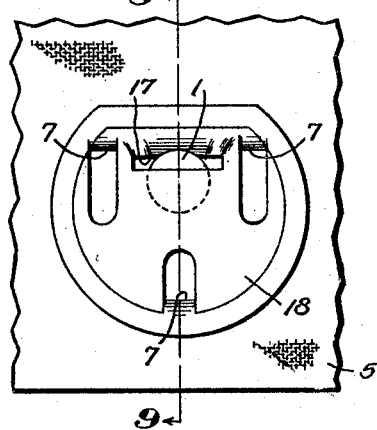
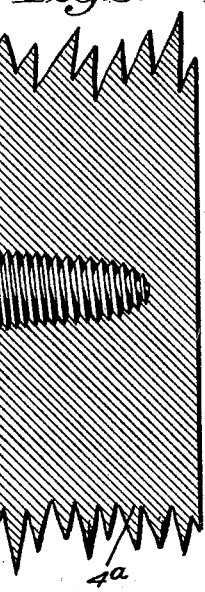
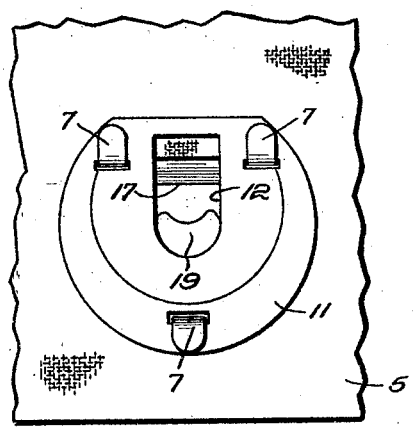
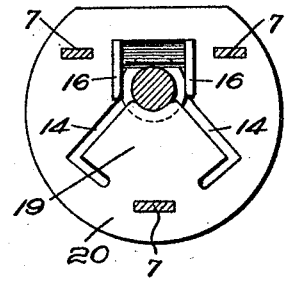
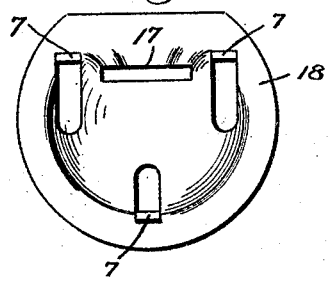

Patented June 1, 1926.

1,586,856

UNITED STATES PATENT OFFICE.

SERIAH STEVENS, DECEASED, LATE OF ROSLINDALE, MASSACHUSETTS; BY RUEY BARTLETT STEVENS, EXECUTRIX, OF ROSLINDALE, MASSACHUSETTS, ASSIGNOR, BY MESNE ASSIGNMENTS, TO CARR FASTENER COMPANY, OF CAMBRIDGE, MASSACHUSETTS, A CORPORATION OF MAINE.

FASTENER.

Application filed July 24, 1924. Serial No. 727,991.

This invention aims to provide an improved separable fastener.

In the drawings, which illustrate a preferred and a modified form of the invention:—

Fig. 8 is a front elevation of the modified form of fastener;

Fig. 9 is a section on the line 9—9 of Fig. 8, being partly in elevation;

Fig. 10 is a rear elevation of the modified form of socket;

Fig. 11 is a section on the line 11—11 of Fig. 9; and

Fig. 12 is a rear elevation of the modified form of front plate.

Figure 1:
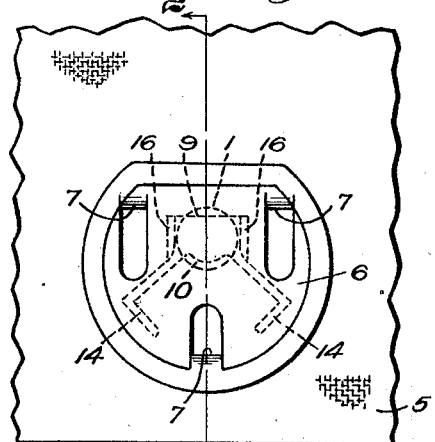
Figure 1 is a front elevation of the preferred form of fastener.

Referring to the drawings, he has shown a three-side lock separable fastener which includes a stud of the usual type, cylindrical in cross-section and presenting a head 1, a neck 2 and a shank 3 secured to an attaching screw 4 which may be screwed into the body 4 of an automobile, as illustrated. The fastener also includes a socket, which presents rigid jaw means and resilient jaw means for engagement with the neck of the stud and means engageable with the shank of the stud to prevent separation of the socket from the stud at three sides thereof.

The jaw means are preferably located at the outer face of the curtain beyond the plane of the curtain, thereby to prevent an upward or lateral strain on the curtain from tipping the socket out of engagement with the stud.

Referring now to the preferred form of his invention, he has shown, as illustrated, a socket for cooperation with a stud, of the above-mentioned type, to secure the curtains 5 of automobiles or the like, to the body of an automobile or the like.

The socket comprises a front plate 6 presenting a plurality of attaching prongs 7 pressed therefrom, a jaw plate 8 presenting a fixed jaw 9, a resilient jaw 10, and a back plate 11 presenting a stud-receiving aperture 12 elongated at one side thereof. All of the above-mentioned parts are secured to the curtain 5 by the attaching prongs 7, which pass through the jaw plate 8 (Figs. 2, 3 and 4), then through the curtain 5 and back plate 11, against which they are clenched as best illustrated in Fig. 5.

Figure 6:
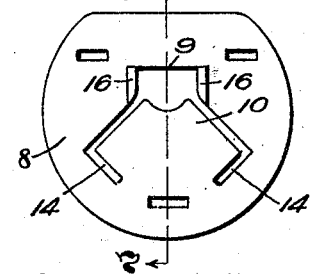
Fig. 6 is an elevation view of the jaw member.
Figure 7:
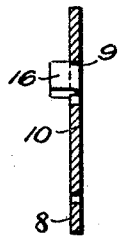
Fig. 7 is a section on the line 7—7 of Fig. 6.

The jaw plate 8 (Figs. 6 and 7) is formed from a flat sheet of spring metal and presents a stud-receiving aperture 12 at the upper periphery of which is presented the fixed jaw 9 and at the lower periphery of which is presented the resilient jaw 10. The resilient jaw 10 is formed by two slots 13, 13 which extend diagonally downward, from the aperture 12, a substantial distance therefrom and then inwardly again for a shorter distance, as shown in Fig. 6. Thus the resilient jaw is free to flex about a line between the lower ends of the slots 13, 13.

To permit free tipping movement of the socket relative to the stud during intervals of engaging and disengaging the socket therewith, he has provided a fixed jaw 9 which presents a straight edge, about which the socket may pivot when engaged with the neck 2 of the stud. The resilient jaw 10, however, is preferably curved (Fig. 6) so as to provide a bearing surface which engages a considerable portion of the lower side of the neck of the stud, thereby to prevent, to a certain extent, sidewise movement of the socket relative to the stud.

Sidewise movement, which causes rattle, is further prevented by providing two flanges 15, 15 which extend from the jaw plate (Fig. 6) adjacent the sides of the aperture 12 and engage the head of the stud when the socket is secured therewith. These flanges 15, 15 are formed by the metal which is pressed out of the jaw plate 8 to form the aperture 12 therein.

Both the front plate 8 and the back plate 11 are dished outwardly from the curtain to permit the resilient jaw 10 to be bent toward either plate, as the case may be, when engaging the stud with or disengaging it from the stud.

The back plate also presents an aperture 16 which fits relatively close to three sides of the shank of the stud (Fig. 5), thereby to engage the shank of the stud to prevent separation from the stud as more fully hereinafter described. The aperture is preferably elongated at one side thereof, so that the back plate will not engage the shank of the stud at that side where the socket is being separated from the stud.

Figure 3:
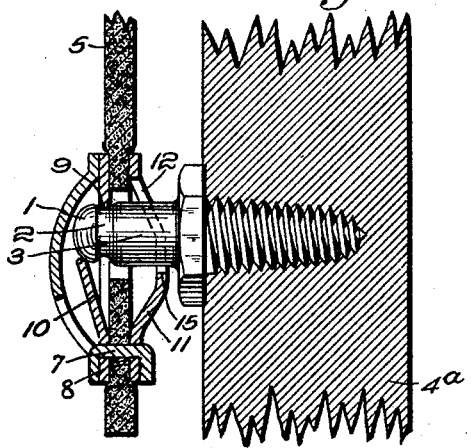
Fig. 3 is a section similar to Fig. 2, showing the position of the socket and stud before the resilient jaw is engaged with the neck of the stud.

When engaging the socket with the stud, the head of the stud passes through the aperture 16 in the back plate and because the head of the stud is larger in cross-section than the aperture between the jaws, it engages the resilient jaw 10 and forces it outwardly to permit passage of the head of the stud through the aperture 12 and engagement of the fixed jaw with the neck 2 of the stud, as best shown in Fig. 3.

Figure 2:
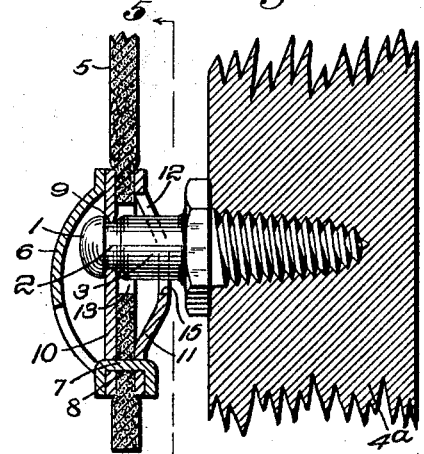
Fig. 2 is a section on the line 2—2 of Fig. 1, being partly in elevation.

Further pressure upon the socket tips the bottom thereof inwardly and permits the resilient jaw 10 to become engaged with the neck of the stud, whereby the socket swings outwardly until the fixed jaw 9 and resilient jaw 10 are in the same plane, as best shown in Fig. 2.

When the socket is secured to the stud (Fig. 2), it is locked therewith against separation by a lateral strain on the curtain because the jaw plate is located in front of the line of strain on the curtain. Thus the socket tips only slightly relative to the stud, and then inwardly, until the back plate contacts with the shank of the stud.

Separation of the socket from the stud, by an outward pull on the curtain at both sides or above the stud, is also prevented by the back plate, which tips slightly inwardly until the periphery of the aperture 16 contacts with the shank of the stud, thus preventing sufficient tip to disengage the socket from the stud.

Figure 4:
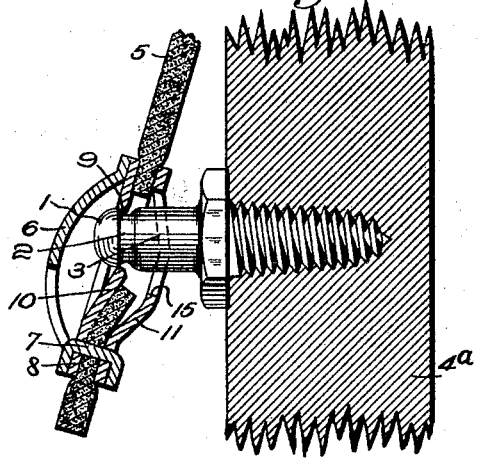
Fig. 4 is a section similar to Fig. 2, showing the socket being withdrawn from the stud.
Figure 5:
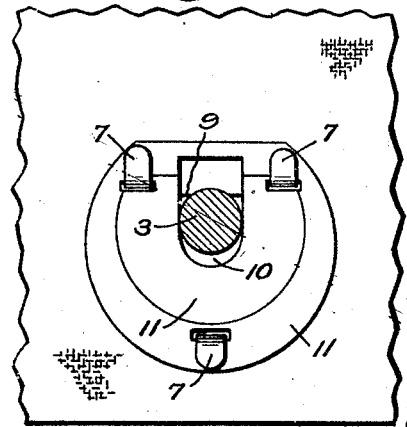
Fig. 5 is a section on the line 5—5 of Fig. 2, showing the rear elevation of the socket.

The socket may be separated from the stud by grasping the lower edge of the curtain and exerting a slight outward pull thereon, as illustrated in Fig. 4. Thus the socket tips about the fixed jaw 9 and the resilient jaw 10 is forced toward the back plate until it tips out of engagement with the neck of the stud and over the head thereof, thereby permitting the fixed jaw to be tipped out of engagement with the neck of the stud.

It will be understood from the foregoing description that there is provided a three-side lock fastener, in other words, a fastener which cannot be separated by a pull at three sides thereof, but may be separated by a pull at a fourth predetermined side thereof.

Referring now to the modified form of his invention, as illustrated in Figs. 8 through 12, he has shown a socket substantially like the one illustrated and described relative to the preferred form of his invention. In this instance, however, the fixed jaw 17 is formed by depressing a portion of the front plate 18, so that the jaw may be aligned, when assembled to the curtain 5, with the spring jaw 19, presented by the jaw plate 20. The jaw plate 20 is substantially like the one shown and described relative to the preferred form of his invention, except that the aperture therethrough is somewhat larger to permit the fixed jaw to be entered therein above the resilient jaw. The rest of the socket is similar to the preferred form of socket and operates the same as the preferred form of socket when engaging and disengaging the stud.

While he has shown and described a preferred and a modified form of his invention, it will be understood that changes involving omission, substitution, alteration and reversal of parts, and even changes in the mode of operation, may be made without departing from the scope of his invention, which is best defined in the following claims.

Claims:

1. A three-side lock fastener comprising, in combination, a stud having a head and a neck generally circular in cross-section, a socket presenting a fixed jaw and a spring jaw at the front face of a socket-carrying medium for engagement with opposite sides of said neck, said spring jaw located adjacent to the lower edge of the carrying medium and adapted to yield in one direction when said socket is being engaged with said stud and in the opposite direction when said socket is being disengaged from said stud.

2. A three-side lock fastener comprising, in combination, a stud having a head and a neck generally circular in cross-section, a socket presenting a fixed jaw and a spring jaw at the front face of a socket-carrying medium for engagement with opposite sides of said neck, said spring jaw located adjacent to the lower edge of the carrying medium and adapted to yield in one direction when said socket is being engaged with said stud and in the opposite direction when said socket is being disengaged from said stud, and locking means provided by said socket independently of said jaws for preventing separation of said socket from said stud except by a pull in a predetermined direction.

3. A three-side lock fastener comprising, in combination, a stud having a head and a neck generally circular in cross-section, a socket having a fixed jaw and a spring jaw located adjacent to the lower edge of said socket and engageable with the neck of said stud by pressing said socket over the head of said stud until said fixed jaw is engaged with said neck and thereafter tipping said socket inwardly at the bottom thereof to engage said spring jaw with said neck.

4. A stud and socket fastener comprising, in combination, a stud having a head, a neck and a shank portion, a cooperating socket presenting a stud-receiving aperture surrounded by a wall relatively closely embracing three sides of said shank portion to limit the tipping action of said socket when strain is exerted at three sides thereof, and a spring plate presenting a fixed jaw for engagement with one side of said neck and a spring finger adjacent to the lower edges of the socket for engagement with the opposite side of said neck, said spring finger adapted to flex in one direction when engaging said stud and in the opposite direction when disengaging said stud.

5. A stud and socket fastener comprising, in combination, a stud having a head, a neck, and a shank portion, a cooperating socket presenting a stud-receiving aperture surrounded by a wall relatively closely embracing three sides of said shank portion, a one-piece neck-engaging member presenting a fixed jaw and a resilient jaw adjacent to the lower edge of the socket for engagement with said neck, said wall adapted, when tipped, to engage the shank of said stud to prevent separation of said stud and socket by a strain exerted upon three sides thereof.

6. A stud and socket fastener comprising, in combination, a stud having a head and a neck, a socket including a one-piece neck-engaging member presenting an aperture therethrough to permit passage of said head, a rigid portion for engagement with one side of said neck, a resilient part for engagement with the opposite side of said neck, and means presented by said socket for engagement with the head of the stud to prevent sidewise shifting movement of said socket relative to said stud.

7. A stud and socket fastener comprising, in combination, a stud having a head and a neck, a socket including a one-piece neck-engaging member presenting an aperture therethrough to permit passage of said head, a rigid portion for engagement with one side of said neck, a resilient part for engagement with the opposite side of said neck, and means integral with said neck-engaging member for engagement with said head to prevent shifting of said socket relative to said stud.

8. A three-piece fastener socket including a front plate, a jaw-presenting plate, and a back plate, means for securing all of said plates to a socket-carrying medium, and means for preventing separation of said socket from a stud except by a pull in a predetermined direction.

9. A socket for a separable fastener including a fixed jaw and a resilient jaw located at the front face of a socket-carrying fabric, and a back plate located at the opposite face of the fabric, said back plate presenting a stud-receiving aperture and means for preventing separation of said socket from a stud by tipping action at three sides, said resilient jaw free to bend toward either side of the plane of said fixed jaw to permit engagement or disengagement of said socket with a stud.

10. A socket for a separable fastener including a front plate and a neck-engaging jaw plate located at the front side of a socket-carrying fabric, a back plate at the opposite side of the fabric and means for securing said plates to said fabric, said front plate and back plate arched to permit forward and backward movement of one jaw of said neck-engaging plate.

11. A jaw plate for a separable fastener including a fixed neck-engaging jaw and a resilient neck-engaging jaw provided by a plurality of slots extending from an aperture between said jaws thereby to permit flexing of said resilient jaw upon a line between the ends of said slots, and means integral with said jaw plate for engagement with the sides of the head of a stud when the neck-engaging jaws are engaged with the neck of said stud.

12. A separable fastener comprising, in combination, a stud having a head, a neck and a shank portion, a socket including means for securing said socket to a flexible socket-carrying medium, a neck-engaging fixed jaw and a resilient jaw normally in the same plane and located at the front face of the socket-carrying medium to prevent outward tipping of said socket relative to said stud when lateral strain is exerted upon said carrying medium, and a back plate located at the opposite side of the socket-carrying medium and presenting an elongated aperture normally closely embracing three sides of said shank portion of said stud to prevent separation of said socket from said stud at three sides thereof when said stud is tipped about said fixed jaw to release said resilient jaw.

13. A three-piece fastener socket including a front plate, a jaw-presenting plate located at one side of a socket-carrying medium and a back plate located at the opposite side, and a plurality of attaching prongs presented by said front plate for positioning said jaw plate relative to said back plate and for securing all of said plates to the socket-carrying medium.

14. A three-piece fastener socket including a front plate, a jaw-presenting plate located at one side of a socket-carrying medium, and a back plate located at the opposite side and a plurality of attaching prongs struck out from the body of said front plate, said prongs passing through slots in said jaw-presenting plate, through a socket-carrying medium and through slots in said back plate against which they are clenched to secure all of said plates to the carrying medium.

In testimony whereof, I have signed my name to this specification.

RUEY BARTLETT STEVENS,
*Executrix of Seriah Stevens, Deceased.*